July 10, 1962 H. A. SEIDMAN 3,043,964

STEP SWITCH PULSE GENERATOR

Filed April 28, 1960 2 Sheets-Sheet 1

INVENTOR.
HERBERT A. SEIDMAN

BY H. S. Mackey

ATTORNEY.

INVENTOR.
HERBERT A. SEIDMAN
BY H. A. Mackey
ATTORNEY.

United States Patent Office 3,043,964
Patented July 10, 1962

3,043,964
STEP SWITCH PULSE GENERATOR

Herbert A. Seidman, Bronx, N.Y., assignor to General Precision, Inc., a corporation of Delaware Filed Apr. 28, 1960, Ser. No. 25,300
4 Claims. (Cl. 307—88.5)

This invention relates to pulse generators and particularly to generators of pulse trains which are synchronous with the movements of a step switch.

Such a train of synchronous pulses can ideally be generated by connecting all of the fixed contact points of a step switch bank to a load and applying an electrical source to the switch arm contact. In practice, however, contact bounce and variable contact resistance cause loss of pulses, introduction of spurious pulses and generally erratic operation.

The purpose of this invention is to provide a pulse generator circuit which is free from these faults.

The present invention provides a combination of a step switch with a bistable multivibrator, sometimes termed a flip-flop circuit, and an additional component to combine the two outputs of the flip-flop into a single output train of pulses.

A better understanding of this invention may be secured from the detailed description and associated drawings, in which.

Figure 1:
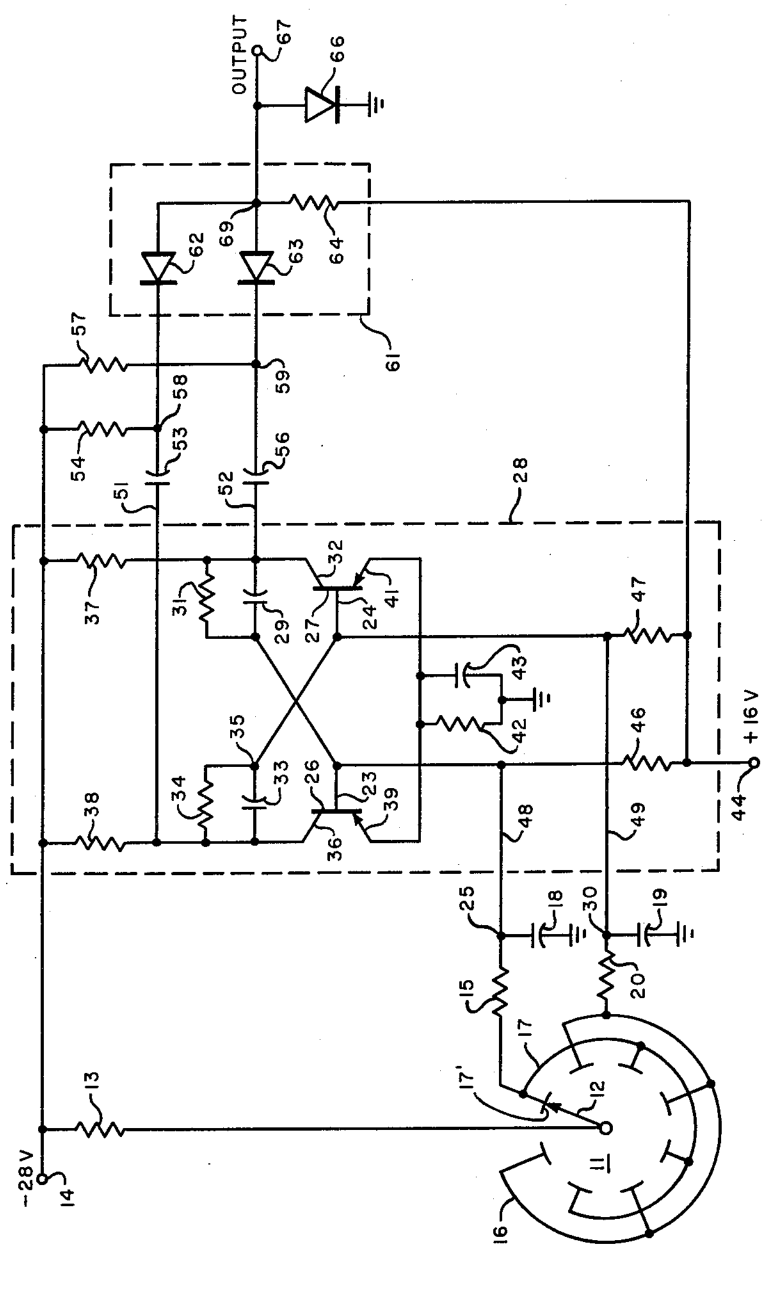
FIGURE 1 is a schematic diagram of one embodiment of the invention.

Referring now to FIGURE 1, one bank of a multibank rotary step switch is schematically represented at 11. The rotating arm 12 is connected through a resistor 13 to a negative 28-volt potential terminal 14. Alternate contacts of the bank are strapped together by a conductive wire 16 and all of the remaining contacts are strapped together by a second conductive wire 17. The strap wires are respectively coupled to ground through resistor 15 and capacitor 18, and through resistor 20 and capacitor 19. The resistor-capacitor junctions 25 and 30 are connected to the base terminals 23 and 24 of two transistors 26 and 27.

The transistors 26 and 27 comprise a flip flop, or bistable multivibrator stage 28. The base 23 of transistor 26 is connected through capacitor 29 and resistor 31 to the collector 32 of transistor 27, and the base 24 of transistor 27 is connected through capacitor 33 and resistor 34 to the collector 36 of transistor 26. The collectors 32 and 36 are supplied with negative potential from terminal 14 through resistors 37 and 38, and the emitters 39 and 41 are connected together and grounded through the common resistor 42 shunted by capacitor 43. The bases 23 and 24 are biased to a potential of +16-volts applied at terminal 44 through resistors 46 and 47.

The conductors 48 and 49 connected to the transistor base terminals 23 and 24 constitute the set and reset inputs, respectively, of the multivibrator stage. The multivibrator stage outputs are taken from the collectors 36 and 32 through conductors 51 and 52.

In place of the transistor flip flop or bistable multivibrator circuit 28 shown in the drawing, any other circuit such as an electronic tube circuit, which performs the same functions, may be employed.

The multivibrator stage output conductors 51 and 52 are connected to two differentiating circuits, one consisting of series capacitor 53 and shunt resistor 54, and the other consisting of series capacitor 56 and shunt resistor 57. The resistors 54 and 57 are connected to the power terminal 14.

The junctions 58 and 59 of the differentiating circuits are connected to the inputs of a logical OR circuit, 61, consisting of diodes 62 and 63 and resistor 64. A limiting diode 66 is added to drain positive pulses to ground, thus confining the output at terminal 67 to negative pulses. The diodes 62, 63, and 66 may be any type of unilaterally conductive elements, as is well undertood in the art.

The bistable multivibrator 28 is stable with transistor 26 conducting and transistor 27 non-conducting, or vice versa. When a negative pulse is applied to the base of the non-conducting transistor it becomes conducting and the collector voltage changes from, say, −15 v. to a voltage near zero, say −5 v. This in turn causes the other transistor to become non-conducting and the collector voltage to change from −5 to −15 volts.

Figure 2:
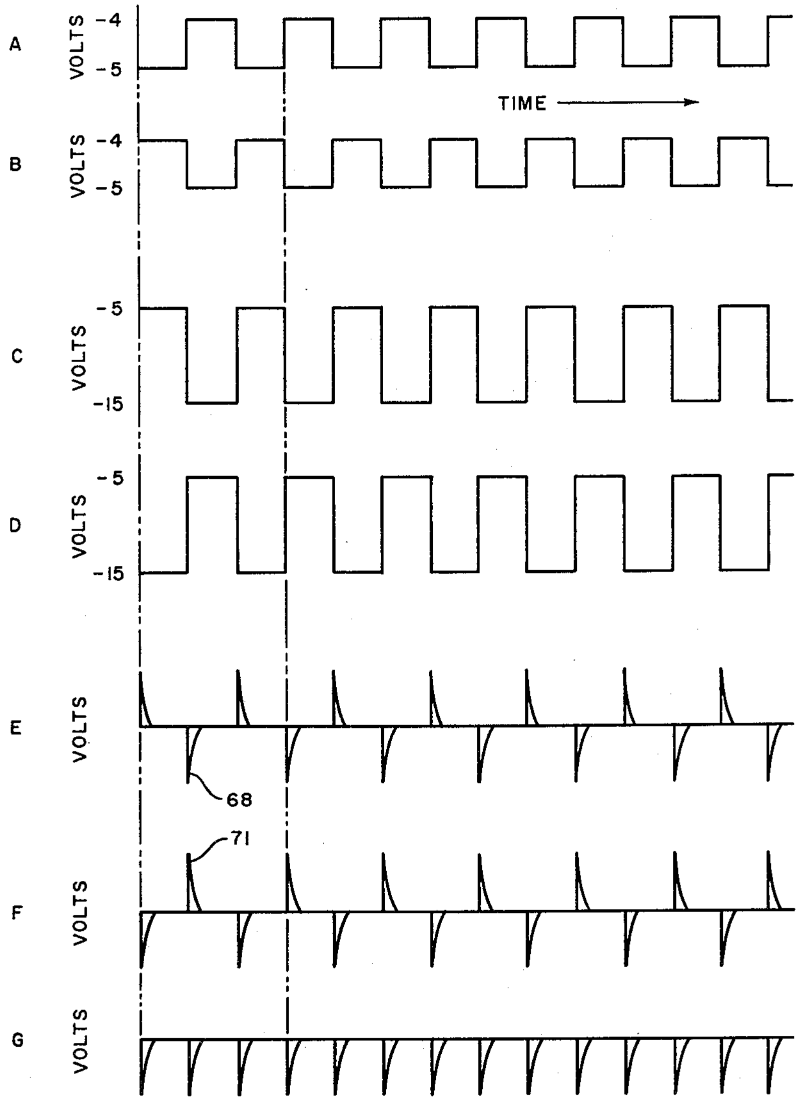
FIGURE 2 depicts graphs illustrating the operation of the invention.

In the normal operation of an ideal step switch, adjacent contacts are never bridged, so that when, for example, in switch 11, the slider 12 is on any contact the base terminal of the transistor to which it is connected receives, for example, −5 volts and the base terminal of the other transistor receives, say, −4 volts. These voltages are produced by adjusting the resistive drops produced across voltage divider circuits. If, as drawn, slider 12 is on contact 17′, −5 volts are applied to the transistor base 23 from the junction of resistors 15 and 46, these resistors being bridged in series with resistor 13 between the negative and positive power terminals 14 and 44. At the same time the transistor base 24 receives voltage from the junction 35 of the power divider consisting of resistors 38, 34 and 47 bridged between terminals 14 and 44, junction 35 having, in this example, the value of −4 volts. When the slider 12 leaves the terminal 17′ and after a momentary period of no contact, engages the next terminal, the other base terminal receives −5 volts and the first base potential becomes −4 volts, thus switching the multivibrator to its other stable condition. Thus the succession of contacts in the switch is synchronously reproduced as a square wave of potential at the collector 36 and a second square wave of potential of opposite phase at the collector 32. The potentials of the two sets of switch contacts 17 and 16 and of the connected base terminals 23 and 24 are graphically shown in FIGURE 2, graphs A and B. The corresponding collector potentials are shown in graphs C and D.

It has been found however, that step switches do not always behave in the normal manner described. The hiatus between the contact of arm 12 at one contact point and at the next contact point sometimes is lacking, and the arm 12 makes the second contact before it breaks the first. This simultaneously applies potential from the −28 volt source to both bases and may cause uncertain multivibrator action. Consequently the capacitors 18 and 19 are provided to act, in conjunction with resistors 13, 15 and 20, as integrators having a time constant of about 1 millisecond. They thus prevent any momentary switch short circuit from having any effect on the multivibrator.

The multivibrator output trains on conductors 51 and 52 are differentiated by capacitors 53 and 56, and resistors 54 and 57, to produce the sharp positive and negative pulses shown in graphs E and F. These pulses are applied to the OR circuit 61. This circuit emits an output when either input is energized. In this case the OR circuit also distinguishes between positive and negative pulses, transmitting only the latter. For example, when the negative pulse 68, graph E, generated at junction 58 is applied through diode 62 to junction 69, it tends to make diode 63 non-conductive, so that the pulse 71, simultaneously appearing at junction 59, cannot get through diode 63. Thus, all negative pulses applied from both junctions 58 and 59 appear at junction 69 and the output terminal 67, and no positive pulses at junctions 58 and 59 are allowed to pass. However, vestigial remains of positive pulses which may be transmitted are shunted to ground by the limit circuit consisting of diode 66, which places an upper limit of approximately ground potential on the output pulse train. This output negative pulse train is shown in graph G.

Jitter of the switch output voltage during switch contact, caused by contact bounce or variable contact resistance, cannot cause multiple output pulses because these extraneous pulses are applied to that multivibrator input which has already been energized. Since the multivibrator is in a stable state due to energization of one selected input, further energization of that input can have no further effect.

To summarize, the instrument output is not affected by contact bounce and resistance variation because of the provision of the multivibrator 28, and output is not affected by inadvertent shortcircuiting of adjacent switch contacts because of the provision of the integrating circuits of capacitors 18 and 19.

What is claimed is:

1. A pulse generator comprising, a flip-flop circuit having a pair of input terminals and a pair of output terminals, a step switch having the moving contact arm of one bank connected to a source of potential, alternate fixed contact points of said bank being connected to one of said flip-flop input terminals and the remaining fixed contact points thereof being connected to the other said flip-flop input terminal, a differentiating circuit connected to differentiate the two oppositely phased output signals on said flip-flop output terminals and emitting two differential signals, and an OR circuit receiving said two differential signals to produce a train of like-polarized pulse signals substantially synchronous with the time of electrical contacts of said switch bank moving contact arm with said fixed contact points.

2. A pulse generator comprising a step switch having alternate fixed contact points of one bank connected to a first terminal and having the remaining fixed contact points connected to a second terminal, means applying potential to the bank switch arm, a flip-flop circuit having a pair of input terminals termed set and reset respectively and a pair of output terminals carrying first and second potentials in one of the bistable circuit conditions and second and first potentials in the other condition, means connecting said first terminal to said set terminal, means connecting said second terminal to said reset terminal, differentiating means connected to the output terminals of said flip-flop circuit producing a pair of trains of oppositely phased differentiated pulse signals, and an OR and limit circuit having said pair of trains impressed thereon and producing therefrom a single train of like-polarized pulse signals in substantial synchronism with the stepping of said step switch.

3. A pulse generator comprising a step switch having a contact bank and arm, the alternate contacts thereof being connected to a first terminal and the remaining contacts to a second terminal, the arm thereof being supplied with direct potential, a pair of RC integrating circuits connected to said first and second terminals respectively whereby the effects of terminal bridging are eliminated, a flip-flop circuit having set and reset input terminals connected to said first and second terminals respectively and having a pair of output terminals carrying opposite phases, a pair of RC differentiating circuits connected to said pair of output terminals respectively and having a pair of differentiation output terminals, an OR circuit having two input circuit terminals connected respectively to said pair of differentiation output terminals, said OR circuit having a single output terminal, and a voltage-limiting circuit connected to said single output terminal.

4. A pulse train generator having pulses synchronous with the step motions of a step switch comprising, a flip-flop circuit having set and reset inputs and a pair of outputs emitting oppositely-phase square wave trains, a step switch having a moving contact of one bank thereof connected through a resistor to a source of potential, said step switch having alternate fixed contacts of said bank connected through a resistor to said set input and having the remaining fixed contacts of the bank connected through a resistor to said reset input, a capacitor connected in shunt with said set input forming with said resistor an integrating circuit, a second capacitor connected in shunt with said reset input forming with said resistor a second integrating circuit, a capacitor and resistor connected to one of said pair of outputs forming a first differentiating circuit, a capacitor and resistor connected to the other of said pair of outputs forming a second differentiating circuit, an OR circuit having a pair of inputs and an output, a connection from said first differentiating circuit to one input of said OR circuit, a connection from said second differentiating circuit to the other input of said OR circuit, and a limit circuit connected to the output of said OR circuit causing the output signal thereat to consist of a monopolar pulse train in which each consecutive pulse occurs at the time of contact of said moving contact with a consecutive fixed contact delayed by a time proportional to the time constant of one of said first and second integrating circuits.

References Cited in the file of this patent

UNITED STATES PATENTS

| | | |
|---|---|---|
| 2,518,324 | Hurley | Aug. 8, 1950 |
| 2,583,587 | Milsom | Jan. 29, 1952 |
| 2,758,205 | Lubkin | Aug. 7, 1956 |
| 2,774,957 | Towner | Dec. 18, 1956 |